United States Patent [19]

Hays

[11] Patent Number: 4,830,164
[45] Date of Patent: May 16, 1989

[54] HEAT PUCK FOR CLUTCHES AND FLYWHEELS

[76] Inventor: Bill J. Hays, 10582 Palladium Ave., Garden Grove, Calif. 92640

[21] Appl. No.: 88,812

[22] Filed: Aug. 24, 1987

Related U.S. Application Data

[63] Continuation of Ser. No. 786,232, Oct. 10, 1985, abandoned.

[51] Int. Cl.⁴ .................. F16D 13/60; F16D 13/68; F16D 65/02
[52] U.S. Cl. .................. 192/107 R; 192/70.13; 192/70.14; 192/107 M; 188/250 G
[58] Field of Search .......... 192/107 R, 107 M, 70.13, 192/70.14; 188/250 G

[56] References Cited

U.S. PATENT DOCUMENTS

| | | | |
|---|---|---|---|
| 2,348,025 | 5/1944 | Peets et al. | 192/107 R |
| 2,835,367 | 5/1958 | Steck | 192/107 R |
| 3,761,231 | 9/1973 | Dowell et al. | 192/107 M |
| 4,171,038 | 10/1979 | Sommer | 192/70.13 |
| 4,326,614 | 4/1982 | Matagrano | 192/107 R |

FOREIGN PATENT DOCUMENTS

| | | | |
|---|---|---|---|
| 2455635 | 5/1976 | Fed. Rep. of Germany | 188/250 G |
| 2922165 | 12/1980 | Fed. Rep. of Germany | 192/70.13 |

Primary Examiner—Rodney H. Bonck
Assistant Examiner—David A. Testardi
Attorney, Agent, or Firm—Plante Strauss & Vanderburgh

[57] ABSTRACT

A heat puck has a trapezoidal shape with a steel base plate and a thick layer of a high heat capacity material such as copper. The heat puck is attached to either or both the pressure plate and flywheel of an otherwise conventional automotive clutch assembly. Preferably a circular array of heat pucks are mounted on a respective plate or flywheel. The puck is mounted with a large diameter shoulder member that extends through an aperture in the puck and is received in an aligned receptacle in the surface of the plate or flywheel. A screw or rivet fastener extends through the shoulder member, puck and plate or flywheel to retain the assembly. The shoulder member provides the necessary torque resistance to the assembly, protection the fastener from stress failure.

6 Claims, 4 Drawing Sheets

HEAT PUCK FOR CLUTCHES AND FLYWHEELS

BACKGROUND OF THE INVENTION

1. Field of the Invention

This invention relates to a heat shield for clutches and flywheels and, in particular, to a heat shield installation which is universally adaptable for clutches and flywheels of widely varied diameters.

2. Brief Statement of the Prior Art

In most automative and truck vehicles, torque is transmitted to the drive shaft through a clutch disc that is mounted on the drive shaft and received between a pressure plate of the clutch and the flywheel. Resilient springs, either coil springs or a Bellville spring, apply a resilient force to the pressure plate to bias it towards the flywheel, frictionally securing the clutch disc between the pressure plate and the flywheel, and a lever mechanism is provided to release the spring force and retract the pressure plate to disengage the clutch.

Efforts have been made to shield the flywheel and clutch parts against the heat which is generated during operation of the clutch, particularly in racing applications with high engine speeds. Thermally insulating washers have been mounted beneath the clutch springs, and heat shields of various designs have been applied to flywheels. Examples of such heat shields are: steel discs with sintered bronze coatings which are riveted to a flywheel; and coatings of steel or bronze deposited on the face of a flywheel by plasma spraying. These applications are commonly used with aluminum pressure plates and flywheels, since aluminum provides a very poor frictional surface and must be coated with bronze or steel. In most applications, the sintered coating is ground to minimal thickness, usually about 0.080 inch, or less.

While the various prior art approaches have generally been identified as "heat shields", the applications have predominantly been directed to improving the frictional surface in contact with the clutch disc facings, rather than providing optimum heat shielding capability. As an example, very little attention has been directed to isolating the heat and to providing a substantial heat sink on the frictional surface of the flywheel or pressure plate.

Pucks, in the form of ceramic coated copper plates having trapezoidal, or circular segmental shapes have been riveted onto the tips of three- and four-point discs to provide the heat resistance of metallic discs and the lightness of organic discs. Similar pucks have been sintered onto steel discs to provide metallic friction facings in attempts to withstand high temperatures developed by the heat generated in the clutch. Sintered iron facings have been required in slider clutches since the large amounts of heat generated with this competition clutchb would disentegrate a clutch disc with a organic facing. These approaches have unnecessarily compromised the design of the clutch discs, which should have minimal mass and maximum frictional characteristics.

One major difficulty in providing economic retrofitting of a heat shield to clutch pressure plates, or rings, and flywheels has been that these members have a wide variety of diameters and surface areas. The conventional approach of riveting a bronze coated steel disc to the face of a pressure plate or flywheel would thus require that a multitude of heat shields of different diameters be manufactured and stocked in inventory of a parts supply house. Very considerable investments ibn tooling and inventory are thus reqired with the conventional approach. Additionally, considerable care must be exercised in selecting a rivet pattern in a flywheel or pressure plate to avoid structurally weakening the member to such a degree that it will fail when subjected to high rotational speeds.

BRIEF DESCRIPTION OF THE INVENTION

The invention comprises the assembly of a plurality of thermally isolating pucks onto the disc engaging surface of flywheels and pressure plates of clutches. Each puck has a trapezoidal, or circular segmental shape and a steel base plate with a thick layer of a high heat capacity solid, typically ceramic, bronze or copper. The plurality of pucks are mounted on the clutch engaging surface of the flywheel or pressure plate in a circular array, so that any sized member can be fitted simply by increasing or decreasing the number of pucks in the circular array, and are secured to the member by suitable fasteners such as rivets or screw fasteners. The supporting member, either flywheel or pressure plate is modified by forming a circular array of depressions which receive shoulders dependent from the pucks, thereby providing a high degree of torque resistance to the assembly. The depressions can be coutnerbores in the bores of the flywheel or pressure plate which receive the fasteners, and the shoulders which are dependent from the pucks can be grommets or nuts with flanged heads.

BRIEF DESCRIPTION OF THE DRAWINGS

The invention will be described with reference to the FIGURES, of which.

DESCRIPTION OF PREFERRED EMBODIMENTS

Figure 1:
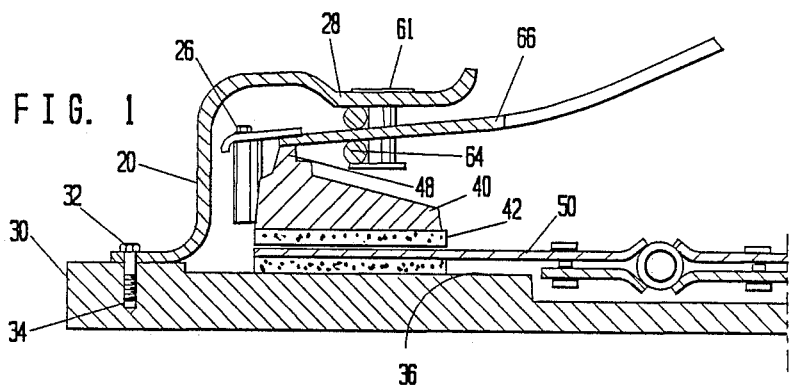
FIG. 1 is a cross section through a typical clutch and flywheel assembly.

Referring now to FIG. 1, a conventional clutch cover and flywheel assembly is illustrated in cross sectional view. The particular assembly which is illustrated has a diaphragm pressure plate, however, the invention is equally applicable to other pressure plate designs such as those using levers and compression coil springs, rather than the illustrated diaphragm.

The clutch cover 20 is secured to the flywheel 30 by a plurality of screw fasteners 32 which are received in internally threaded bores 34 in the flywheel. The pressure plate 40 has a flat undersurface 42 which engages the clutch disc 50 and applies pressure thereto, frictionally securing the disc 50 between the engaging surface 42 of the pressure plate and the engaging surface 36 of the flywheel. A plurality of bosses 24 are peripherally disposed about the cover 20 and receive machine bolts 26 which maintain retractor springs 60 in the assembly. Cover 20 has a generally flat annular land 28 which has a plurality of spaced apart apertures that receive fasteners such as rivets 61 which retain the upper pivot ring 62 and the lower pivot ring 64 for the Bellville diaphragm 66. The peripheral edge of the Bellville diaphragm 66 engages the upstanding edge 48 on the upper face of the pressure plate 40.

The pressure plate 40 is secured in the assembly by drive straps (not shown) which extend between the underside of the cover 20 and the pressure plate 40, thereby rotationally interlocking these members, while permitting relative axial movement. The retractor springs 60 are spaced equally about the periphery of the pressure ring on the upper ends of bosses 24 and the inside ends of the springs hook over the top of the Bellville diaphragm 66, interlocking the peripheral edge of the diagphragm to the pressure ring so that an upward flexing of this peripheral edge (which occurs when the diaphragm is compressed) retracts the pressure plate from the disc 50.

Figure 2:
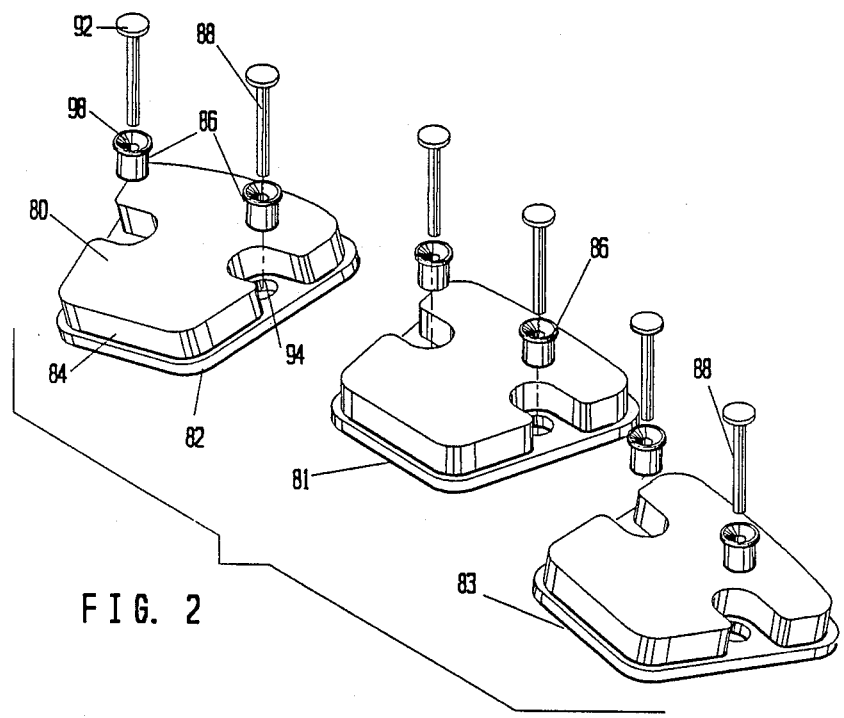
FIG. 2 is a isometric view of pucks useful in the invention.

Referring now to FIG. 2, a heat puck 80 which can be used in the invention is shown with a base plate 82 that is formed of a metal having a high tensile strength and moderate to low thermal conductivity, e.g., carbon alloy steel, or nickel or vanadium alloy steels, being suitable. The base plate is from 0.010 to 0.375 inch, preferably from 0.167 to 0.325 inch thick. The puck has a relatively thick layer 84 of a thermal heat sink, which can be of metal such as copper, brass, bronze, cast iron, steel, etc., or of ceramic, e.g., titania, alumina, clays, etc. The heat sink layer 84 is preferably formed by sintered powdered techniques, in which finely subdivided powders of the selected material are composited with suitable binders and compressed and heated to sinter the powders into an integral composite mass. Powders of the aforementioned metals can be used alone, or in combination with ceramic oxides, or graphite powders in this technique to provide composite layers of widely varied heat capacity and surface frictional characteristics. The heat sink layer is from 0.325 to about 0.750 inch, preferably from about 0.425 to about 0.500 inch, thick. The thickness of this layer, the choice of the heat sink material, and the number and spacing of the pucks on the supporting member, either pressure plate or flywheel, are selected to provide a sufficient mass of the heat sink layer to absorb the heat which is released in the very short shifting time, less than 5 seconds, and more typically less than 3 seconds, without reaching a temperature at which the coefficient of friction of the surface of the puck begins to deteriorate. The mass and heat capacity of the pucks, and the total number of pucks which are placed in the assembly, are chosen so that they will absorb the heat release by shifting without exceeding a temperature at which the friction characteristics deteriorate. With discs having organic facings, this temperature is not more than 500° F., preferably not more than 400° F. With iron facings, the temperature is not more than 800° F., and for sintered metal facings such as sintered iron facings, this temperature is not more than 1500° F., preferably not more than 1200° F.

The pucks can be spaced about the flywheel or pressure plate in a staggered or entirely circular array, which is preferably symetrical. The spacing between the pucks can be preselected to provide air circulation for rapid cooling of the pucks between shifting cycles, and to provide for discharge of material which is worn from the facing of the pucks. In this regard the pucks provide an enhanced performance as they function similarly to fan blades and increase the air circulation through the clutch housing.

The pucks also provide capability to closely control the coefficient of friction on the flywheel and/or pressure plate. Typically, copper surfaces provide the highest coefficients, from 0.4 to 0.6; iron provides coefficients about 0.3, and steel provides coefficients about 0.2. Pucks having varied metals, or metal composites, can be intermixed in a single assembly to provide average coefficients of friction intermediate the aforestated values. As an example, four copper pucks with a coefficient of friction of 0.6, interspaced with three steel pucks would provide an average coefficient of friction of about 0.43.

The puck is attached to a flywheel or pressure plate with suitable fasteners, e.g., rivets 88, which extend through strengthening grommets 86. Each grommet has a concave top surface 90 to receive the head 92 of its respective rivet 88, and is received in a bore 94 in the base plate 82. The heat sink layer 84 has slots 96 about each bore 94 to permit the upper lips 98 of the grommets 86 to bear directly against the base plate 82. The grommets 86 provide the shoulder means interconnecting the pucks with their supporting member and provide the shear strength to the assembly which is necessary to prevent the pucks from being dislodged during use. For this application, the shoulder means, i.e., the depth to which the pucks project into the supporting member, should be at least 0.060 inch, but not more than approximately 75% of the thickness of the supporting member. In this fashion, the necessary shear strength is provided without weakening the supporting member to a point where it can be overstressed and fail. In the application with grommets and rivets, the rivets can be from ⅛ to ⅜ inch in diameter, and the grommets of greater diameters, from ⅜ to 1.5 inches in diameter.

Figure 3:
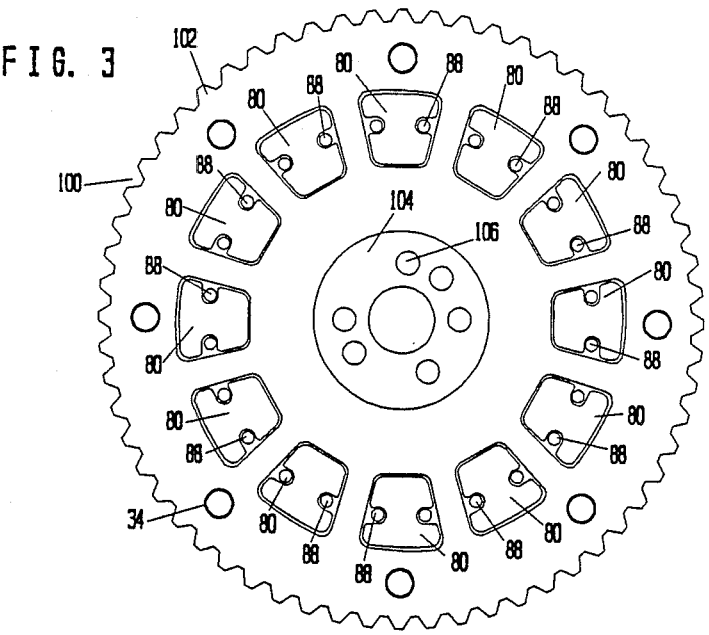
FIG. 3 is a plan view of a flywheel fitted with pucks of the invention.

A plurality of pucks are arrayed in a generally circular pattern, as illustrated by the pucks 80, 81 and 83 in FIG. 2. The shape of the pucks readily permits such arrangement, since the pucks are either trapezoidal, or circular segmental in area, thereby permitting their assembly about circular patterns of greatly varied diameter. A typical application to a flywheel is shown in FIG. 3. As there illustrated, the flywheel 100 has peripheral gear teeth 102 for engagement by the drive gear of the starter motor, and a hub 104 with a central pattern of apertures 106 for assembly. The flywheel also has a peripheral array of apertures 34 which receive fasteners 32 that secure the clutch housing 20, as described and illustrated in FIG. 1. Twelve pucks 80 are disposed about the flywheel in a circular pattern 110, each with its respective rivets 88 and grommets 86.

Figure 4:
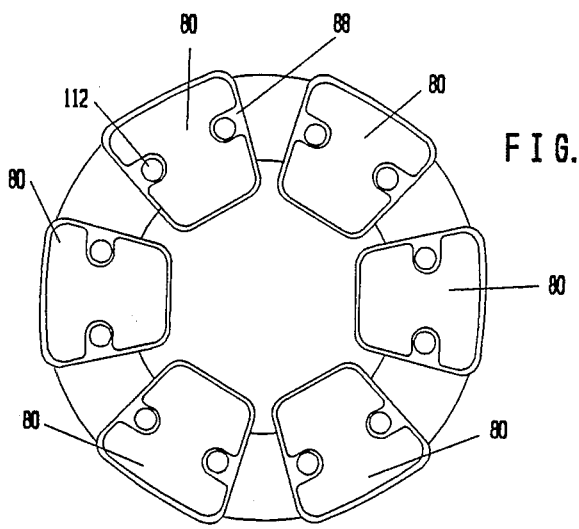
FIG. 4 is a plan view of a pressure plate fitted with pucks of the invention.

Referring now to FIG. 4, the spacing and arrangement of the pucks 80 can be widely varied, depending on the specific application. In the illustrate example, the pressure plate is a relatively narrow ring 112, and the pucks 80 can be secured to the ring 112 in equally spaced increments, such as six pucks, spaced, one every 60 degrees.

Figure 5:
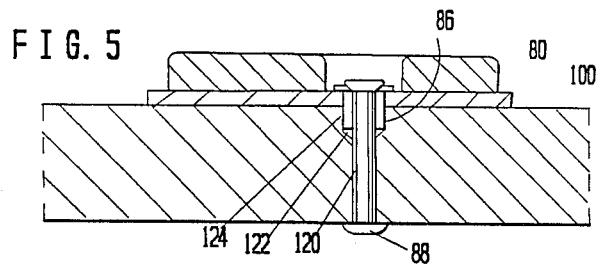
FIG. 5 is a sectional view along lines 5—5 of FIG. 3.

The pucks are secured to the flywheel or pressure plate requires with one to four fasteners. Preferably, two fasteners are used, such as rivets 88. The fasteners, which extend entirely through the supporting plate, either the pressure plate or flywheel have a diameter of 0.250 inch or less. FIG. 5 is a cross section of a suitable assembly of the puck 80 to flywheel 100. As there illustrated, the flywheel 100 has a through aperture 120 to receive each rivet 88, and the aperture 120 is counterbored at 122 to provide a surface recess to receive the shoulder 124 of grommet 86. This assembly provides the necessary shear strength to prevent dislodgement of the pucks 80, while avoiding any significant weakening of the supporting structure.

Figure 6:
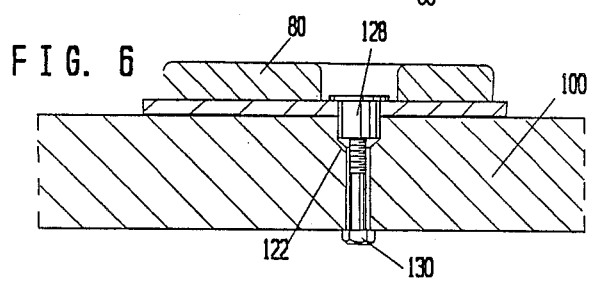
FIGS. 6–10 are sectional views illustrating various attachments to pressure plates or flywheels.

Other shoulder means can be used to provide the necessary shear strength to retain the pucks 80 on the supporting structure. FIG. 6 illustrates an assembly in which a special nut fastener 128 having the same external shape as the grommets 86, previously described is reused. Fastener 128 is internally threaded to receive a machine screw 130, and projects into the counterbore 122 of flywheel 100.

Figure 7:
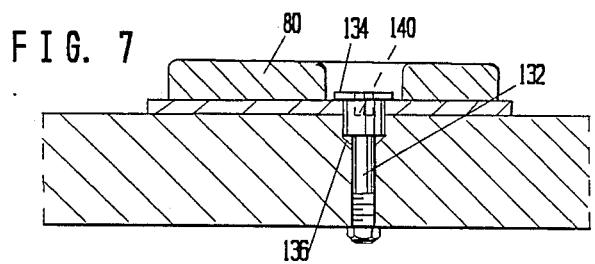
Figure 8:
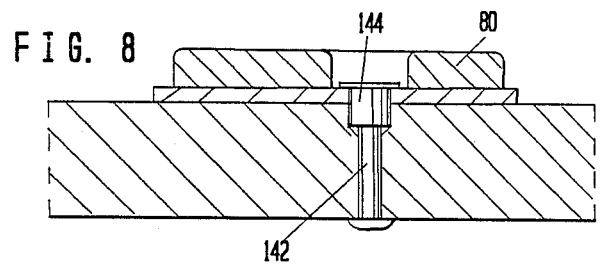

FIG. 7 illustrates a suitable assembly in which a threaded fastener 132 having a head 134 with a large diameter shank 136 is secured with a nut 138. The fastener head 134 can be slotted, or can have an Allen socket 140. If desired, a special rivet 142 can be used with a large diameter shank 144 and head 146, all as shown in FIG. 8.

Figure 9:
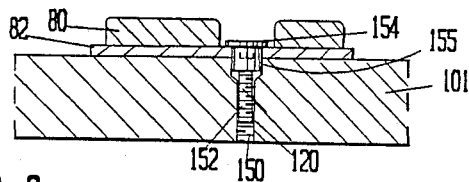
Figure 10:
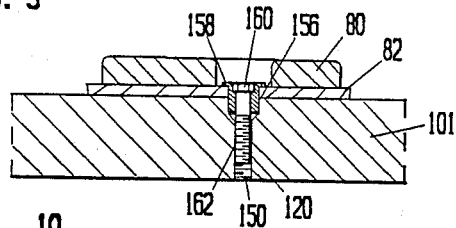

Other alternative assembly includes internal threads 150 on the through apertures 120 of the supporting pressure plate or flywheel 101, shown in FIG. 9. A machine screw 152 with a head 154 and large diameter shank 155 can be used. Alternatively, a special grommet 156, shown in FIG. 10 can be used. The grommet 156 has a recess 158 in its head to receive the head 160 of a machine screw 162.

Figure 11:
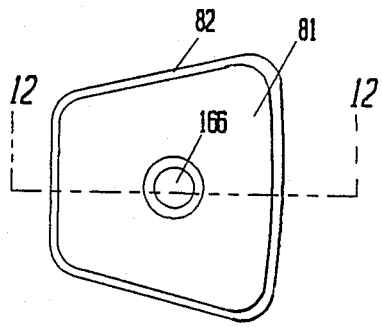
FIGS. 11 and 12 illustrate an alternative assembly of a puck to a pressure plate or flywheel.
Figure 12:
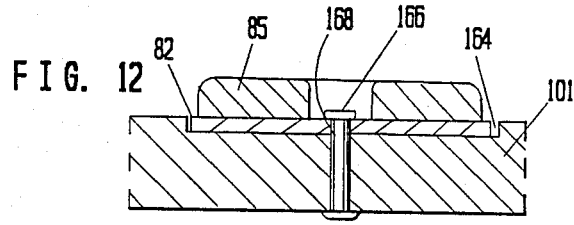

FIGS. 11 and 12 illustrate another embodiment in which a recessed pocket 164 is provided in the surface of a pressure plate or flywheel 101. The pocket 164 has the same dimensions as the puck 85, and has a depth corresponding to the thickness of the metal base plate 82 of the puck. The base plate 82 thus functions as the shoulder, providing shear strength to the assembly. In this application, only a single fastener 166 can be used, preferably centrally located through a small diameter aperture 168 in the puck 85.

Figure 13:
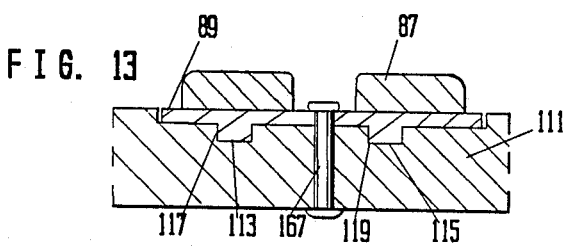
FIG. 13 illustrates an alternative assembly of a puck to a pressure plate or flywheel.

FIG. 13 illustrates another embodiment in which the shoulder means between the puck 87 and the supporting member 111 includes a pair of bosses 113 and 115 which are dependent from, and preferably, are integral with, the undersurface of the base plate 89. The supporting member 111 is provided with a pair of matching recesses 117 and 119 to receive the bosses 113 and 115 of the puck 87. As with the other illustrated embodiments, this design permits maintaining the diameter of the through bore 167 in the supporting member 111 at a minimal value, as the shear loading of the assembly is absorbed by the bosses 113 and 115.

The preferred attachment of the puck to the supporting plate or flywheel provides some thermal isolation of the puck, since any laminated assembly does not have the thermal conductivity of a single integral member. This is the preferred construction as it isolates the heat generated during operation of the clutch, and the pucks thus truely function as heat shields.

The heat pucks of the invention provide very effective and economical control over clutch design. The pucks are designed with sufficient mass of the heat sink layer to absorb the heat which is released in the very short shifting time, less than 5 seconds, and more typically less than 3 seconds, without reaching a temperature at which the coefficient of friction of the surface of the puck begins to deteriorate. Additionally, the pucks increase air circulation through the clutch housing and thus enhance cooling of the clutch.

The pucks also provide capability to closely control the coefficient of friction on the flywheel and/or pressure plate by intermixing pucks with different heat sink materials in a single assembly to provide average coefficients of friction intermediate the values from the materials, used singely.

The pucks also reduce fabrication costs, since their use eliminates the need for costly precision grinding of the surfaces of flywheels and pressure plates. The costs and time for repair of a damaged clutch are also reduced, as a damaged puck can quickly be replaced, and as the cost of replacement pucks is far less than the more precisely machined supporting member, such as the flywheel or pressure plate.

One of the major advantages of this heat puck invention is that the design of the clutch disc is not compromised by the necessity to provide heat sink masses or surfaces in the clutch disc. The mass and centrifigual forces developed by the clutch disc must be kept at minimal values, as the synchronized transmissions stop rotation of the clutch disc during the shifting cycle. The necessity in the prior art to absorb significant amounts of heat and to remove that heat through the clutch disc assembly greatly compromises its design, limiting the choice of materials and increasing the mass and centrifugal forces of the clutch disc. This invention eliminates the need for heat shields on the clutch disc by providing the heat sinks on the opposing members (flywheel and/or pressure plate) and permits free choice of materials including organic composites, carbon fiber reinforced plastics, etc., as well as light weight metals and metal composites.

The invention has been described with reference to the illustrated and presently preferred embodiment. It is not intended that this disclosure of the presently preferred embodiment by unduly restricting. Instead, it is intended that the invention be defined by the means, and their obvious equivalents, set forth in the following claims:

What is claimed is:

1. In an automotive clutch having a clutch housing secured to the face of a flywheel member with a clutch disc received between a clutch pressure plate member and said flywheel member and resilient means to bias said pressure plate member towards said flywheel member and fictionally restrain said disc between a pressure plate member disc engaging surface and a flywheel member disc engaging surface, the improvement comprising:
   (a) a plurality of heat shield pucks disposed in a circular array about the surface of at least one of said disc engaging surfaces, each puck comprising:
      (i) a heat sink layer having a thickness from 0.325 to about 0.750 inch and formed of a material having a high heat capacity; and
      (ii) a metal base plate permanently attached to the undersurface of said heat sink layer and having a thickness of at least 0.01 inch, and at least one through, base plate aperture of a first diameter;
   (b) a plurality of internally threaded second apertures of a lesser diameter than said first diameter, disposed in a generally circular array about said at least one engaging surface, each of said second apertures aligned with a respective base plate aperture;
   (c) counterbores of said first diameter in each of said second apertures extending from said engaging surface, each of said counterbores aligned with a respective one of said first apertures; and (d) screw fasteners, each having a threaded end, and an enlarged diameter shank and extending through each of said aligned first apertures and counterbores with its threaded end received in said second apertures to secure said pucks to said engaging surface and to retain said enlarged diameter shanks within their respective counterbores.

2. The clutch improvement of claim 1 wherein said base plate is formed of steel.

3. The clutch improvement of claim 2 wherein said heat sink layer is formed of copper.

4. The clutch improvement of claim 1 wherein said heat sink layer has a roughened surface with a high coefficient of friction.

5. In an automotive clutch having a clutch housing secured to the face of a flywheel member with a clutch disc received between a clutch pressure plate member and said flywheel member and resilient means to bias said pressure plate member towards said flywheel member and fictionally restrain said disc between a pressure plate member disc engaging surface and a flywheel member disc engaging surface, the improvement comprising:

(a) a plurality of heat shield pucks disposed in a circular array about the surface of at least one of said disc engaging surfaces, each puck comprising:
  (i) a heat sink layer having a thickness from 0.325 to about 0.750 inch and formed of a material having a high heat capacity;
  (ii) a metal base plate permanently attached to the undersurface of said heat sink layer and having a thickness of at least 0.01 inch, and at least one through bore of a first diameter; and
  (iii) a grommet received in each of said through bores in said base plates and projecting beneath its respective base plate;

(b) a plurality of second through bores of a lesser diameter than said first diameter, disposed in a generally circular array about said at least one engaging surface, each of said second through bores aligned with a respective base plate through bore;

(c) a plurality of surface recesses also disposed in said generally circular array about said at least one engaging surface, with a respective one of said grommets projecting into a respective one of said surface recesses; and (d) rivets extending through each of said grommets and aligned pairs of through bores to secure said pucks to said engaging surface and to retain said grommets within their respective surface recesses.

6. In an automotive clutch having a clutch housing secured to the face of a flywheel member with a clutch disc received between a clutch pressure plate member and said flywheel member and resilient means to bias said pressure plate member towards said flywheel member and fictionally restrain said disc between a pressure plate member disc engaging surface and a flywheel member disc engaging surface, the improvement comprising:

(a) a plurality of heat shield pucks disposed in a circular array about the surface of at least one of said disc engaging surfaces, each puck comprising:
  (i) a heat sink layer having a thickness from 0.325 to about 0.750 inch and formed of a material having a high heat capacity;
  (ii) a metal base plate permanently attached to the undersurface of said heat sink layer and having a thickness of at least 0.01 inch, and at least one through bore of a first diameter; and
  (iii) a grommet received in each of said through bores in said base plates and projecting beneath its respective base plate;

(b) a plurality of second through bores of a lesser diameter than said first diameter, disposed in a generally circular array about said at least one engaging surface, each of said second through bores aligned with a respective base plate through bore;

(c) a plurality of surface recesses in said engaging member also disposed in said generally circular array about said at least one engaging surface, with a respective one of said grommets projecting into a respective one of said surface recesses; and (d) screw fasteners extending through each of said grommets and aligned pairs of through bores to secure said pucks to said engaging surface and to retain said grommets within their respective surface recesses.

* * * * *

UNITED STATES PATENT AND TRADEMARK OFFICE
CERTIFICATE OF CORRECTION

PATENT NO. : 4,830,164

DATED : May 16, 1989

INVENTOR(S) : Bill J. Hays

It is certified that error appears in the above-identified patent and that said Letters Patent is hereby corrected as shown below:

Col. 6, Claim 1, line 47, change "fictionally" to --frictionally--

Col. 7, Claim 5, line 22, change "fictionally" to --frictionally--

Col. 8, Claim 6, line 13, change "fictionally" to --frictionally--

Signed and Sealed this

Seventeenth Day of March, 1992

Attest:

HARRY F. MANBECK, JR.

Attesting Officer

Commissioner of Patents and Trademarks